United States Patent
Rao et al.

(10) Patent No.: US 10,127,904 B2
(45) Date of Patent: Nov. 13, 2018

(54) LEARNING PRONUNCIATIONS FROM ACOUSTIC SEQUENCES

(71) Applicant: Google LLC, Mountain View, CA (US)

(72) Inventors: Kanury Kanishka Rao, Sunnyvale, CA (US); Francoise Beaufays, Mountain View, CA (US); Hasim Sak, New York, NY (US); Ouais Alsharif, London (GB)

(73) Assignee: Google LLC, Mountain View, CA (US)

( * ) Notice: Subject to any disclaimer, the term of this patent is extended or adjusted under 35 U.S.C. 154(b) by 115 days.

(21) Appl. No.: 14/811,939

(22) Filed: Jul. 29, 2015

(65) Prior Publication Data

US 2016/0351188 A1 Dec. 1, 2016

Related U.S. Application Data (60) Provisional application No. 62/166,608, filed on May 26, 2015.

(51) Int. Cl.
*G10L 15/00* (2013.01)
*G10L 15/187* (2013.01)
(Continued)

(52) U.S. Cl.
CPC .......... *G10L 15/187* (2013.01); *G06N 3/0445* (2013.01); *G06N 3/084* (2013.01);
(Continued)

(58) Field of Classification Search
CPC ..... G10L 15/063; G10L 15/187; G10L 15/02; G10L 15/16; G10L 2015/025; G10L 15/00; G10L 15/142; G10L 15/144; G10L 25/30
(Continued)

(56) References Cited

U.S. PATENT DOCUMENTS 5,317,673 A * 5/1994 Cohen ............... G10L 15/144
  704/232
6,236,965 B1 * 5/2001 Kim ................... G10L 15/06
  704/232

(Continued)

OTHER PUBLICATIONS

Eyben, "From speech to letters—using a novel neural network architecture for grapheme based ASR", 2009, IEEE Workshop on Automatic Speech Recognition & Understanding, Merano, 2009, pp. 376-380.*

(Continued)

*Primary Examiner* — Olujimi A Adesanya
(74) *Attorney, Agent, or Firm* — Fish & Richardson P.C.

(57) ABSTRACT

Methods, systems, and apparatus, including computer programs encoded on computer storage media for learning pronunciations from acoustic sequences. One method includes receiving an acoustic sequence, the acoustic sequence comprising a respective acoustic feature representation at each of a plurality of time steps; for each of the time steps processing the acoustic feature representation through each of one or more recurrent neural network layers to generate a recurrent output; processing the recurrent output for the time step using a phoneme output layer to generate a phoneme representation for the acoustic feature representation for the time step; and processing the recurrent output for the time step using a grapheme output layer to generate a grapheme representation for the acoustic feature representation for the time step; and extracting, from the phoneme and grapheme representations for the acoustic feature representations at each time step, a respective pronunciation for each of one or more words.

20 Claims, 5 Drawing Sheets

(51) Int. Cl.
  *G10L 15/06* (2013.01)
  *G06N 3/04* (2006.01)
  *G06N 3/08* (2006.01)
  *G10L 15/16* (2006.01)
  *G10L 15/02* (2006.01)

(52) U.S. Cl.
  CPC ............ *G10L 15/063* (2013.01); *G10L 15/16* (2013.01); *G10L 2015/025* (2013.01)

(58) Field of Classification Search
  USPC .................... 704/231, 232, 235, 258, 259
  See application file for complete search history.

(56) References Cited

U.S. PATENT DOCUMENTS

| | | | | |
|---|---|---|---|---|
| 6,411,932 | B1* | 6/2002 | Molnar | G09B 19/04 704/254 |
| 7,406,417 | B1* | 7/2008 | Hain | G10L 13/08 704/260 |
| 7,467,087 | B1* | 12/2008 | Gillick | G10L 15/063 704/260 |
| 8,930,192 | B1* | 1/2015 | Meisel | G10L 13/08 704/260 |
| 9,263,036 | B1* | 2/2016 | Graves | G10L 15/16 |
| 2003/0120482 | A1* | 6/2003 | Tian | G10L 15/12 704/209 |
| 2004/0039570 | A1* | 2/2004 | Harengel | G10L 13/08 704/232 |
| 2007/0112569 | A1* | 5/2007 | Wang | G10L 13/08 704/260 |
| 2010/0057452 | A1* | 3/2010 | Mukerjee | G10L 15/16 704/232 |
| 2011/0238412 | A1* | 9/2011 | Ezzat | G10L 15/187 704/10 |
| 2015/0255069 | A1* | 9/2015 | Adams | G10L 15/187 704/236 |
| 2015/0340034 | A1* | 11/2015 | Schalkwyk | G10L 15/18 704/235 |

OTHER PUBLICATIONS

Graves et al, "Towards end-to-end speech recognition with recurrent neural networks", Jun. 21-26, 2014, In Proceedings of the 31st International Conference on Machine Learning (ICML-14), pp. 1764-1772.*

Graves, "Connectionist Temporal Classification" in "Supervised Sequence Labelling with Recurrent Neural Networks", 2012, pp. 61-93.*

Graves et al, Connectionist temporal classification: Labelling unsegmented sequence data with recurrent neural nets, 2006, In ICML'06: Proceedings of the 23rd International Conference on Machine Learning, pp. 369-376.*

LeCun et al, "A tutorial on energy-based learning," in Predicting Structured Data,MIT Press, 2006, pp. 1-59.*

Rummelhart et al, "Learning representations by back propagation errors", 1986, In Nature (London) 323:533-536.*

Chen et al, "Joint sequence training of phone and grapheme acoustic model based on multi-task learning Deep Neural Networks," Sep. 14-18, 2014, in Proceedings of Interspeech, 2014, pp. 1083-1087.*

Hannun et al, "First-pass large vocabulary continuous speech recognition using bi-directional recurrent DNNs", 2014, In ArXiv 2014, pp. 1-7.*

Doss et al, "Phoneme-grapheme based speech recognition system," 2003 IEEE Workshop on Automatic Speech Recognition and Understanding (IEEE Cat. No. 03EX721), 2003, pp. 94-98.*

Magimai-Doss et al "Joint decoding for phoneme-grapheme continuous speech recognition." Acoustics, Speech, and Signal Processing, 2004. Proceedings.(ICASSP'04). IEEE International Conference on. vol. 1. IEEE, 2004. (Year: 2004).*

Glass, "Towards Unsupervised Speech Processing," The 11th International Conference on Information Sciences, Signal Processing and their Applications: Main Tracks, Jul. 2012, pp. 1-4.

Killer et al., "Grapheme Based Speech Recognition," Eurospeech 2003, pp. 3141-3144, 2014.

Reddy, "Learning pronunciations from unlabeled evidence," Doctoral Dissertation, University of Chicago, 2012, abstract only, 1 page.

Varadarajan et al., "Unsupervised Learning of Acoustic Sub-word Units," Proceedings of ACL-08: HLT, Short Papers (Companion Volume), pp. 165-168, 2008.

Wang and Lee, "Supervised Detection and Unsupervised Discovery of Pronunciation Error Patterns for Computer-Assisted Language Learning," Audio, Speech, and Language Processing, IEEE/ACM Transactions on, 23(3):564-579, Mar. 2015.

White et al., "Unsupervised Pronunciation Validation," ICASSP '09 Proceedings of the 2009 IEEE International Conference on Acoustics, Speech and Signal Processing, pp. 4301-4304, 2009.

* cited by examiner

LEARNING PRONUNCIATIONS FROM ACOUSTIC SEQUENCES

CROSS-REFERENCE TO RELATED APPLICATION

This application claims the benefit of U.S. Provisional Application No. 62/166,608, filed May 26, 2015, the contents of which are incorporated by reference.

BACKGROUND

This specification relates to pronunciation modeling systems.

Some pronunciation modeling systems receive a transcription of one or more words and generate a pronunciation for the words. For example, the pronunciation generated by the pronunciation modeling system for a given word may be a sequence of phonemes that the pronunciation modeling system has classified as representing the transcribed word. A pronunciation modeling system can be used in conjunction with, for example, a speech recognition system or a language modeling system.

SUMMARY

In general, one innovative aspect of the subject matter described in this specification can be embodied in methods that include the actions of receiving an acoustic sequence, the acoustic sequence representing an utterance, and the acoustic sequence comprising a respective acoustic feature representation at each of a plurality of time steps; for each of the plurality of time steps processing the acoustic feature representation for the time step through each of one or more recurrent neural network layers to generate a recurrent output for the time step; processing the recurrent output for the time step using a phoneme output layer to generate a phoneme representation for the acoustic feature representation for the time step; and processing the recurrent output for the time step using a grapheme output layer to generate a grapheme representation for the acoustic feature representation for the time step; and extracting, from the phoneme representations and the grapheme representations for the acoustic feature representations at each time step, a respective pronunciation for each of one or more words.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the phoneme output layer generates a set of scores for the time step, the set of scores for the time step comprising a respective score for each of a plurality of vocabulary phonemes and a blank character phoneme, the score for each vocabulary phoneme representing a likelihood that the vocabulary phoneme represents the utterance at the time step and the score for the blank character phoneme representing a likelihood that the utterance at the time step is incomplete.

In other implementations processing the recurrent output for the time step using a phoneme output layer to generate a phoneme representation for the acoustic feature representation for the time step comprises selecting the highest scoring phoneme from the plurality of phonemes and the blank character phoneme as the phoneme representation for the time step.

In some aspects the grapheme output layer generates a set of grapheme scores for the time step, the set of grapheme scores for the time step comprising a respective grapheme score for each of a plurality of vocabulary graphemes and a blank character grapheme, the grapheme score for each vocabulary grapheme representing a likelihood that the vocabulary grapheme represents the utterance at the time step and the score for the blank character grapheme representing a likelihood that the utterance at the time step is incomplete.

In other aspects the set of grapheme scores for the time step further comprises a respective score for a <space> character grapheme, the grapheme score for the <space> character grapheme representing a likelihood that the utterance at the time step represents a transition from one word to another word.

In some implementations extracting, from the phoneme representations and the grapheme representations for the acoustic feature representations at each time step, a respective pronunciation for each of one or more words comprises delimiting the one or more words by splitting the grapheme and phoneme representations for the acoustic feature representations using the <space> character grapheme.

In other implementations processing the recurrent output for the time step using a grapheme output layer to generate a grapheme representation for the acoustic feature representation for the time step comprises selecting the highest scoring grapheme from the plurality of grapheme and the <space> character grapheme as the grapheme representation for the time step.

In some aspects the recurrent neural network layers are Long Short-Term Memory (LSTM) neural network layers.

In other aspects the phoneme output layer and the grapheme output layer are Connectionist Temporal Classification (CTC) output layers.

In some implementations the recurrent neural network layers, the grapheme output layer and phoneme output layer have been trained using a set of input training data and a backpropagation technique.

In some implementations the backpropagation technique comprises back-propagating gradients for both the grapheme output layer and phoneme output layer to a highest layer of the one or more recurrent neural network layers.

The subject matter described in this specification can be implemented in particular embodiments so as to realize one or more of the following advantages. By employing a neural network with two output layers—a first output layer trained for phoneme recognition and a second output layer trained for grapheme recognition—a pronunciation modeling system can achieve improved performance compared to other pronunciation modeling systems. In addition, the pronunciation modeling system simultaneously recognizes phonemes and graphemes in an audio utterance, improving the computational efficiency of pronunciation learning. Furthermore, a pronunciation modeling system may efficiently process audio logs on a regular basis, e.g., daily, and therefore is sensitive to recently popular words and able to deliver corresponding pronunciations in a timely manner.

A pronunciation modeling system processes un-transcribed audio data for pronunciation learning and does not require both audio data and its transcription in order to generate pronunciations. Therefore, in some implementations, a pronunciation modeling system improves computational costs and requires a reduced amount of data to generate high quality, accurate pronunciations compared to other pronunciation modeling systems. Additionally, the pronunciation modeling system may improve the accuracy and quality of the generated pronunciations by efficiently processing larger volumes of audio data than other pronunciation modeling systems. In further implementations a pronunciation modeling system may process audio logs from a particular geographic region. By directly generating both phoneme and grapheme representations of the audio logs, the generated pronunciations are local, geographically relevant pronunciations and therefore are more accurate than other pronunciation modeling systems, e.g., those which require a linguist's transcription.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
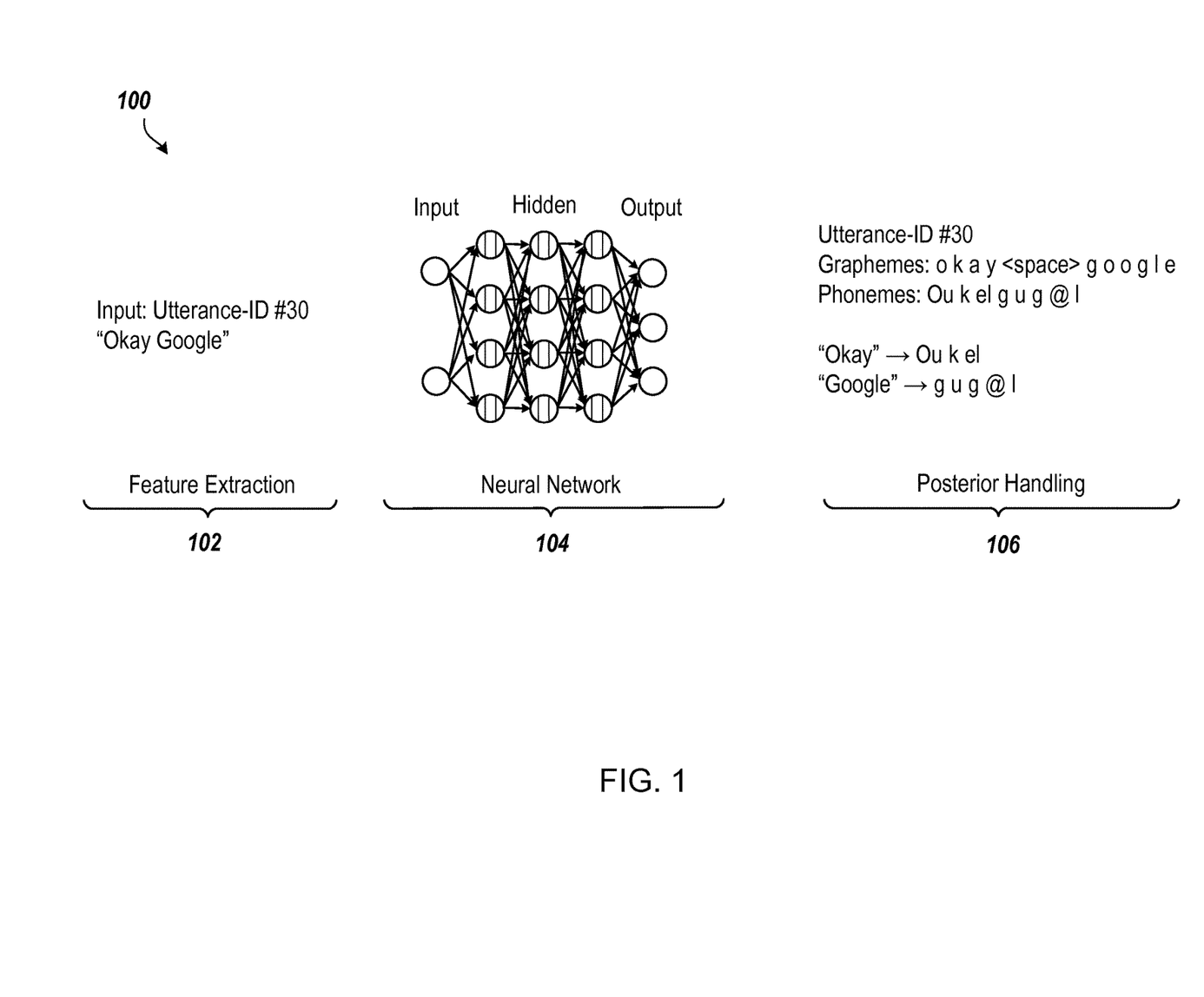
FIG. 1 is an example of a pronunciation modeling system.

FIG. 1 shows an example of a pronunciation modeling system 100. The pronunciation modeling system 100 includes a feature extraction module 102, a neural network 104, and a posterior handling module 106. The pronunciation modeling system 100 is an example of a system implemented as computer programs on one or more computers in one or more locations, in which the systems, components, and techniques described below, can be implemented.

The feature extraction module 102 receives an audio log and generates a feature representation for frames of audio data in the audio log, e.g., from an audio waveform. For example, the pronunciation modeling system 100 may receive a digital representation of an utterance, e.g., as a continuous stream of data, and split the stream into a sequence of multiple frames of data corresponding to a set of time steps, e.g., where each frame is associated with 10 milliseconds of audio stream data. The feature extraction module 102 may analyze each of the frames to determine feature values for the frames and generate corresponding feature representations. For example, the feature extraction module 102 may determine feature values for the frames and place the feature's values in feature representation vectors which can be stacked, e.g., using left and right context of adjacent feature vectors, to create a larger feature representation vector that characterizes the utterance at the corresponding time step.

The neural network 104 receives a feature representation for each of a set of time steps. The neural network 104 is trained to process the feature representations and generate a set of phoneme scores and grapheme scores for each of the time steps.

The posterior handling module 106 processes the phoneme scores and grapheme scores, generates phoneme and grapheme representations of the sequence of acoustic feature representations, and uses the generated phoneme and grapheme representations to determine word pronunciations. Processing phoneme representations and grapheme representations to determine word pronunciations is described in more detail with reference to FIG. 5 below.

The pronunciation system may be used to learn word pronunciations. For example, as shown in FIG. 1, the pronunciation system 100 may receive a digital representation of speech for a window of time where the digital representation of speech includes data representing the utterance "Okay Google." The pronunciation modeling system 100 may divide the window into a number of frames. The feature extraction module 102 determines feature representations for each of the frames, e.g., determines feature vectors for each of the frames, and provides the feature representations for each of the frames to the neural network 104.

The neural network 104 analyzes the feature representations and, for each of the feature representations, generates a set of grapheme scores and a set of phoneme scores. The neural network 104 provides the set of phoneme and grapheme scores for each of the frames to the posterior handling module 106.

The posterior handling module 106 combines the scores for the frames to generate phoneme and grapheme representations of the utterance "Okay Google." For example, as shown in FIG. 1, the posterior handling module may generate the phoneme representation "Ou k el g u g @ l" and the grapheme representation "o k a y <space> g o o g l e." The posterior handling module 106 extracts the word pronunciations "Okay"→"Ou k el" and "Google"→"g u g @l" using the generated phoneme and grapheme representations.

Figure 2:
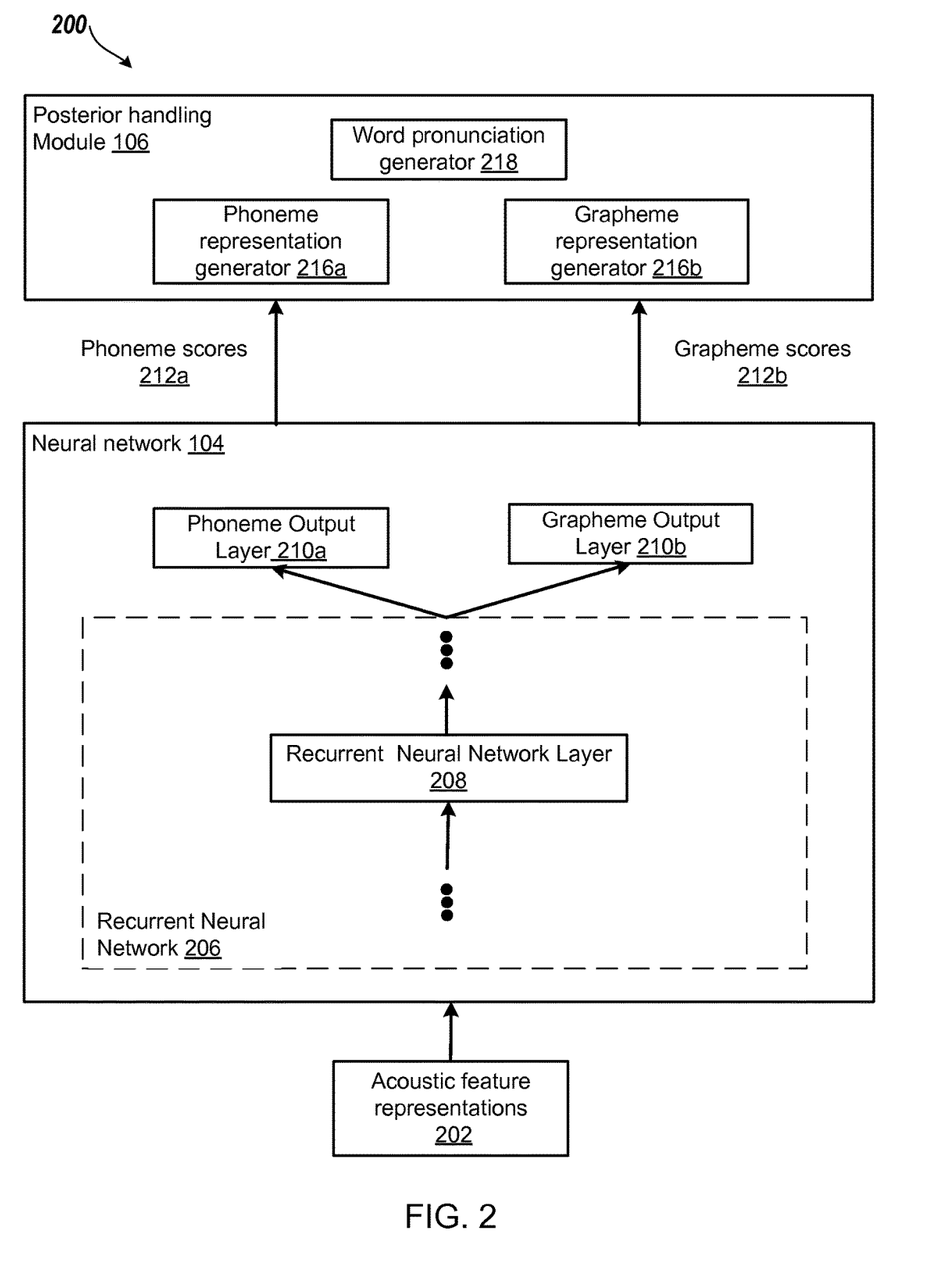
FIG. 2 is a block diagram of an example system for pronunciation learning.

FIG. 2 is a block diagram of the example pronunciation modeling system 100. As described above, the pronunciation modeling system 100 includes the neural network 104 and the posterior handling module 106.

The pronunciation modeling system 100 receives a set of acoustic feature representations that characterizes an utterance, e.g., as generated by the feature extraction module 102 of FIG. 1, and generates corresponding phoneme and grapheme representations for the acoustic feature representations for pronunciation learning. For example, the system 100 can receive acoustic feature representations 202 from the feature extraction module 102 of FIG. 1, generate phoneme and grapheme representations 216a and 216b, respectively, and extract word pronunciations 218 from the phoneme and grapheme representations 216a and 216b.

The neural network 104 includes a recurrent neural network 206 which, in turn, includes one or more recurrent neural network layers, e.g., recurrent neural network layer 208. Although only a single recurrent neural network layer 208 is shown in FIG. 2 for clarity, in some implementations the neural network 104 includes multiple recurrent neural network layers arranged in a sequence from a lowest recurrent layer to a highest recurrent layer. At each time step, each recurrent neural network layer receives an input from the preceding recurrent neural network layer, or, if the recurrent neural network layer is the lowest layer in the sequence of recurrent neural network layers, from the feature extraction module 102 as described with reference to FIG. 1, and generates a layer output for the time step.

The recurrent neural network layers can include one or more Long Short-Term Memory (LSTM) neural network layers. A LSTM neural network layer is a neural network layer that has one or more LSTM memory blocks. An example LSTM neural network that can be used to process acoustic features is described in more detail in "Long Short-Term Memory Based Recurrent Neural Network Architectures for Large Vocabulary Speech Recognition," Haşim Sak, Andrew Senior, Françoise Beaufays, http://arxiv.org/abs/1402.1128.

At each time step, the recurrent neural network 206 processes the feature representation for the time step using the recurrent neural network layers to generate a recurrent output for the time step.

The neural network 104 further includes two output neural network layers, a phoneme output layer 210a and a grapheme output layer 210b. At each time step, the phoneme output layer 210a and grapheme output layer 210b each receive the recurrent output for the time step generated by the recurrent neural network 206 and generate a respective layer output for the time step from the recurrent output.

The phoneme output layer 210a and grapheme output layer 210b can be connectionist temporal classification (CTC) layers.

For example, the phoneme output layer 210a may be a softmax classifier layer that processes the recurrent output for a given time step to generate a set of phoneme scores. Each phoneme score corresponds to a respective phoneme from a set of phonemes. The set of phonemes include a set of vocabulary phonemes and a blank phoneme. The set of vocabulary phonemes are a set of phonemes that may be possible phoneme representations of utterances, and do not include the blank phoneme. The score for a given vocabulary phoneme represents a likelihood that the corresponding phoneme represents the received acoustic feature representation. The score for the blank phoneme represents a likelihood that none of the phonemes in the vocabulary accurately represent the acoustic feature representation or that the acoustic feature representation at the time step is incomplete. An example CTC layer is described in more detail in "Connectionist Temporal Classification: Labelling Unsegmented Sequence Data with Recurrent Neural Networks," Alex Graves, Santiago Fernandez, Faustino Gomez, and Jurgen Schmidhuber, *Proceedings of the 23rd International Conference on Machine Learning*, 2006.

The grapheme output layer 210b can be a softmax classifier layer that processes the recurrent output for a given time step to generate a set of grapheme scores for the time step. Each grapheme score corresponds to a respective grapheme from a set of graphemes. The set of graphemes include a set of vocabulary graphemes, a blank grapheme and a <space> character grapheme. The set of vocabulary graphemes are a set of graphemes that may be possible grapheme representations of utterances, and do not include the blank grapheme or the <space> character grapheme. The score for a given vocabulary grapheme at a given time step represents a likelihood that the grapheme is a representation of the utterance at the time step. The score for the blank grapheme represents a likelihood that none of the graphemes in the vocabulary accurately represent the acoustic feature representation or that the acoustic feature representation at the time step is incomplete. The score for the <space> character grapheme at a given time step represents a likelihood that the utterance at the time step represents a transition from one word to another word.

The posterior handling module 106 processes the phoneme scores 212a and grapheme scores 212b and generates respective phoneme and grapheme representations of the acoustic feature representations. In some implementations, the posterior handling module 106 selects the phoneme from the set of phonemes having the highest score at each time step and outputs a sequence of the selected phonemes as the phoneme representation for the acoustic feature representations. Similarly, in some implementations, the posterior handling module 106 selects the grapheme from the set of graphemes having the highest score at each time step and output a sequence of the selected graphemes as the grapheme representation for the acoustic feature representations.

The posterior handling module 106 uses the generated phoneme and grapheme representations of the acoustic feature representations to determine word pronunciations. Processing phoneme representations and grapheme representations to determine word pronunciations is described in more detail with reference to FIG. 5 below.

Figure 3:
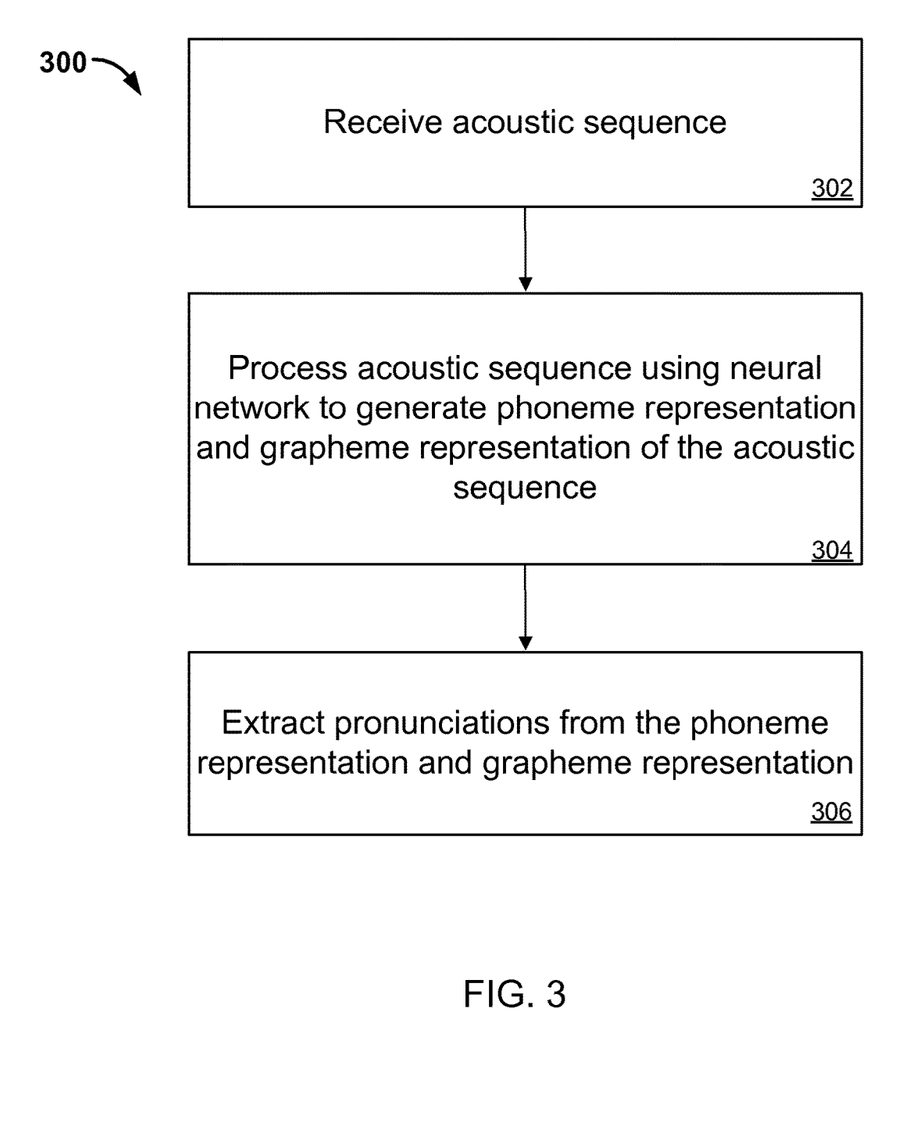
FIG. 3 is a flow diagram of an example process for processing an acoustic sequence.

FIG. 3 is a flow diagram of an example process 300 for processing an acoustic sequence. For convenience, the process 300 will be described as being performed by a system of one or more computers located in one or more locations. For example, a pronunciation modeling system, e.g., the pronunciation modeling system 100 of FIG. 1, appropriately programmed, can perform the process 300.

The system receives an acoustic sequence (step 302). The acoustic sequence represents an utterance and may include a respective frame of data for each of multiple time steps. Each frame of data is an acoustic feature representation of the utterance at the corresponding time step.

The system processes the acoustic sequence using an acoustic modeling neural network to generate a corresponding phoneme representation and grapheme representation of the acoustic sequence (step 304). For example, the system may process the acoustic sequence using an acoustic modeling neural network, e.g., the neural network 104 of FIG. 2, to generate a set of phoneme scores and a set of grapheme scores, e.g., phoneme scores 212a and grapheme scores 212b, for each time step. The system generates a corresponding phoneme representation and grapheme representation of the acoustic sequence using the phoneme scores and the grapheme scores, respectively. Generating phoneme and grapheme representations of acoustic feature representations will be described in more detail below with reference to FIG. 4.

The system extracts word pronunciations from the generated phoneme representation and grapheme representation of the acoustic sequence (step 306). The phoneme representation and grapheme representation are synchronized with respect to time. Therefore, the system may align and split the representations using the grapheme <space> character to convert the phoneme and grapheme representations to word pronunciations. Extracting word pronunciations using a phoneme representation and grapheme representation of an acoustic sequence is described in more detail below with reference to FIG. 5.

Figure 4:
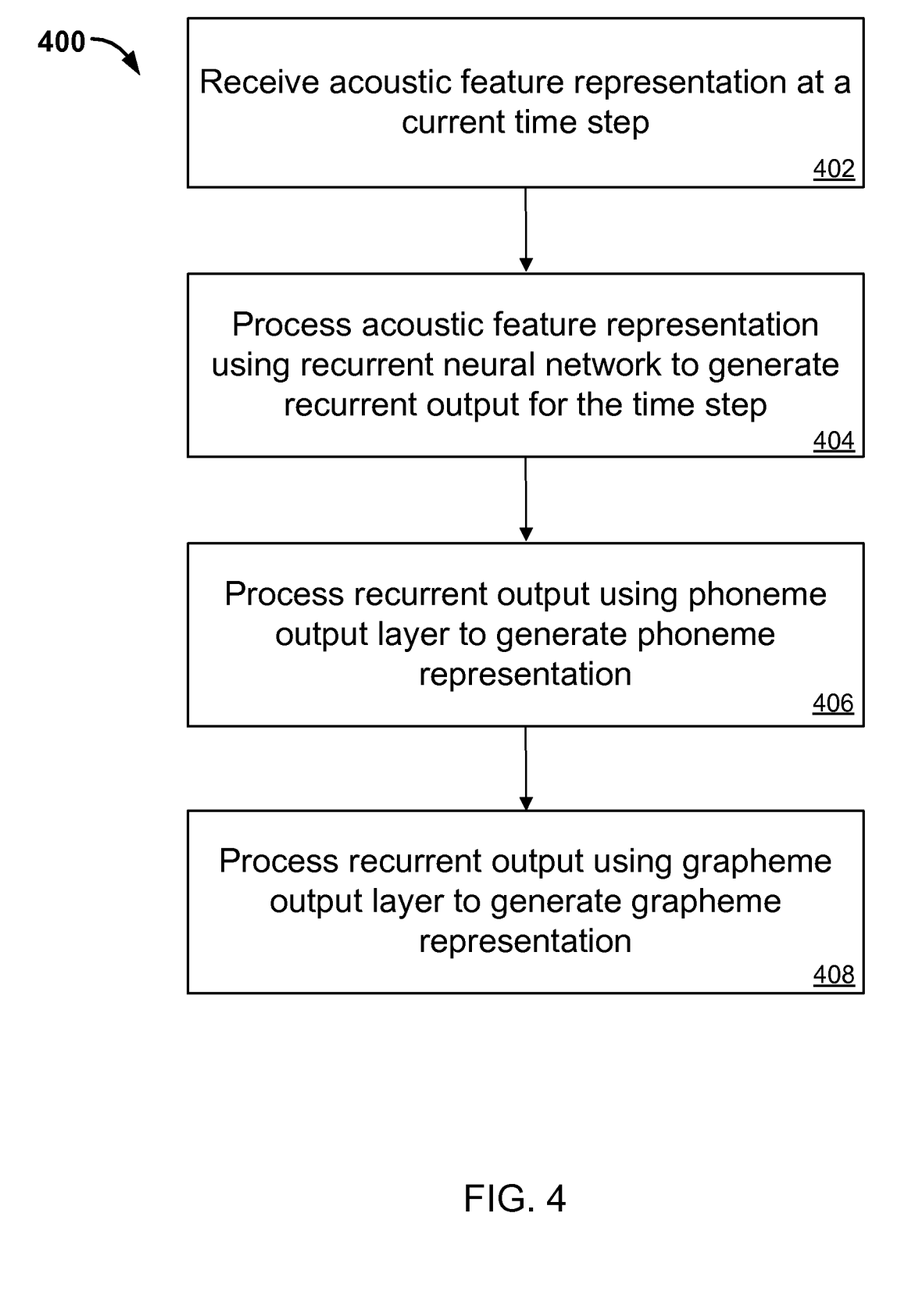
FIG. 4 is a flow diagram of an example process for generating phoneme representations and grapheme representations.

FIG. 4 is a flow diagram of an example process for generating phoneme representations and grapheme representations. For convenience, the process 400 will be described as being performed by a system of one or more computers located in one or more locations. For example, a pronunciation modeling system, e.g., the pronunciation modeling system 100 of FIG. 1, appropriately programmed, can perform the process 400.

The system receives an acoustic feature representation at a current time step (step 402). The acoustic feature representation is one of a set of acoustic feature representations at a set of corresponding time steps that together form an acoustic sequence that represents an utterance.

The system processes the acoustic feature representation at the current time step using a recurrent neural network, e.g., the recurrent neural network 206 of FIG. 2, to generate a corresponding recurrent neural network output (step 404).

The system processes the recurrent neural network output using a phoneme output layer, e.g., the phoneme output layer 210a of FIG. 2, to generate a phoneme representation of the acoustic feature representation (step 406). The phoneme output layer is trained to predict phonemes by processing the recurrent neural network output to generate a set of phoneme scores, as described above in reference to FIG. 2. The phoneme scores are used to generate a phoneme representation of the acoustic feature representation. In some implementations, the phoneme representation of the acoustic feature representation includes the set of phoneme scores for the acoustic feature representation at the current time step. In some other implementations, the system selects a phoneme from the set of phonemes (that includes the set of vocabulary phonemes and the blank phoneme) having the highest score at the time step as the phoneme representation for the acoustic feature representation.

The system processes the recurrent neural network output using a grapheme output layer, e.g., the grapheme output layer 210b of FIG. 2, to generate a grapheme representation of the acoustic feature representation (step 408). The grapheme output layer is trained to predict graphemes by processing the recurrent neural network output to generate a set of grapheme scores, as described above in reference to FIG. 2. The grapheme scores are used to generate a grapheme representation of the acoustic feature representation. In some implementations, the grapheme representation of the acoustic feature representation includes the set of scores for the acoustic feature representation at the current time step. In some other implementations, the system selects a grapheme from the set of graphemes (that includes the set of vocabulary graphemes, the blank grapheme and the <space> character grapheme) having the highest score at the time step as the grapheme representation for the acoustic feature representation.

The processes 300 and 400 can be performed to generate phoneme representations and grapheme representations for pronunciation learning for each time step of an acoustic sequence input for which the desired output is not known, i.e., for a received acoustic sequence for which the desired phoneme and grapheme representations are not known. However the processes 300 and 400 can also be performed for each time step of a training sequence, i.e., an acoustic sequence for which the desired phoneme and grapheme representations are already known, as part of a training process to determine trained values of a set of parameters of the system. For example, the training process may be a conventional LSTM training process, e.g., a backpropagation through time training process.

During the training, the system backpropagates gradients computed for each of the layers of the neural network. In particular, the system backpropagates gradients from both the grapheme output layer and the phoneme output layer to the highest recurrent neural network layer in order to update the parameters of the highest recurrent neural network layer.

In some implementations, the system weights the gradients from the phoneme output layer and the grapheme output layer equally when backpropagating them to the highest recurrent neural network layer. In some other implementations, the system applies different weights to the output layer gradients when backpropagating them to the highest recurrent neural network layer.

Figure 5:
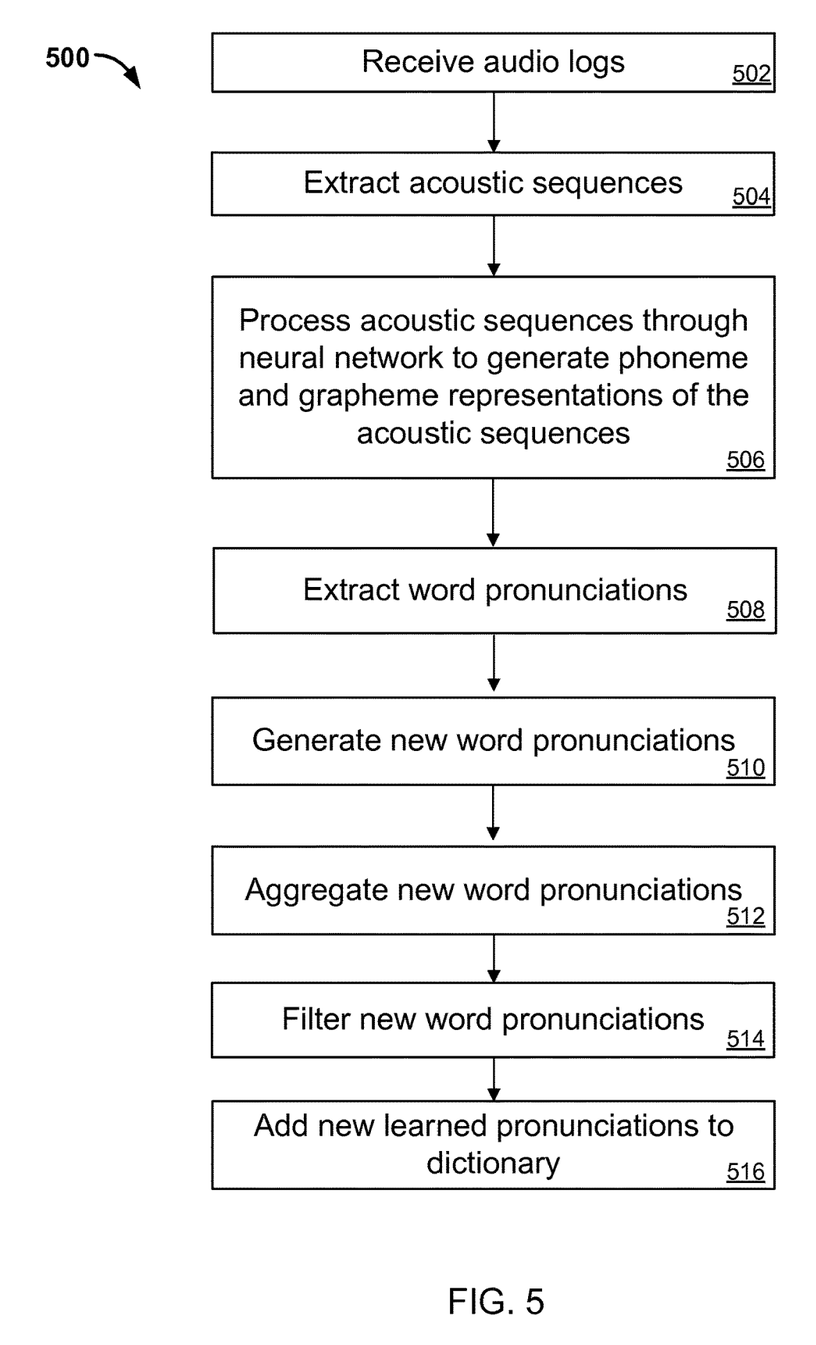
FIG. 5 is a flow diagram of an example process for pronunciation learning.

FIG. 5 is a flow diagram of an example process 500 for pronunciation learning. For convenience, the process 500 will be described as being performed by a system of one or more computers located in one or more locations. For example, a pronunciation modeling system, e.g., the pronunciation modeling system 100 of FIG. 1, appropriately programmed, can perform the process 500.

The system receives one or more audio logs including one or more sets of untranscribed audio data (step 502). The audio logs may include received audio data for processing by a pronunciation modeling system in a most-recent time frame, e.g., during the past hour, day or week.

The system extracts one or more acoustic sequences from the audio logs (step 504). The acoustic sequences may be sequences of frames of data for respective sequences of time steps that represents utterances, for example the utterance "Gangnam style." Each frame of data for a particular time step may include an acoustic feature representation. For example, the pronunciation modeling system 100 may first receive an audio log of utterances comprising a digital representation of speech as a continuous stream of data. The system may extract one or more acoustic sequences from the received audio log by splitting the continuous stream of data into multiple frames of data, for example, where each frame is associated with 10 milliseconds of audio log data.

The system processes the acoustic sequences through the layers of a neural network, e.g., the neural network 104 of FIG. 2, to generate phoneme representations of the acoustic sequences and grapheme representations of the acoustic sequences (step 506). Processing an acoustic sequence or an acoustic feature representation through a neural network to generate a phoneme and grapheme representation of the acoustic sequence or acoustic feature representation is described in more detail above with reference to FIGS. 3 and 4, respectively. For example, for the utterance "Gangnam style" the system may process the corresponding acoustic sequence through the neural network and generate a corresponding phoneme representation such as "g { N g N @ m s t al l" and grapheme representation such as "G a n g n a m <space> s t y l e."

The system extracts word pronunciations from the phoneme and grapheme representations of the acoustic sequences (step 508). The phoneme and grapheme representations are synchronized with respect to time; therefore the representations may be aligned and split using the grapheme <space> character to convert the phoneme-grapheme representation to word pronunciations. Since the phoneme representations and grapheme representations can include one or more blank phonemes or one or more blank graphemes, respectively, the system may remove the blank phonemes and blank graphemes when extracting word pronunciations. For example, for a particular utterance the system may generate a phoneme representation such as "g { N g N @ m s t al l" and a corresponding grapheme representation such as "G a n g n a m <space> s t y l e." The system may then align and split the representations to extract the word pronunciations "Gangnam"→"g{NgN@m" and "style"→"stall."

The system generates a set of new word pronunciations from the extracted word pronunciations (step 510). The system may access a dictionary containing known words and corresponding pronunciations, and filter the extracted words and corresponding pronunciations by removing words and corresponding pronunciations that already exist in the dictionary. For example, the system may access the dictionary containing known words and corresponding pronunciations and determine that the word "style" already exists in the dictionary, and that the word "Gangnam" and corresponding pronunciation "g { N g N @ m" is a new word pronunciation.

The system aggregates the new word pronunciations over all available audio logs (step 512). The system sorts the set of new word pronunciations and selects new word pronunciations according to a set of predetermined measures. In some implementations, the system may determine, for each word pronunciation in the set of new word pronunciations, a frequency of occurrence in all available audio logs. For example, the system may determine that the word "Gangnam" and corresponding pronunciation "g { N g N @ m" appears 768 times in 150 million logs.

The system filters the set of new word pronunciations (step 514). The system may determine a frequency of occurrence threshold and filter the new set of word pronunciations according to the frequency of occurrence threshold. For example, the system may require that each new word pronunciation has a count of at least 500 occurrences in the available audio logs in order for the new word pronunciation to remain in the new set of word pronunciations.

The system adds the filtered set of learned word pronunciations to a dictionary (step 516). Optionally, the system may perform further verification procedures on the filtered set of learned word pronunciations before adding the set to the dictionary. The dictionary of learned word pronunciations may be provided for use in various settings, e.g., speech recognition systems or text-to-speech systems.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving an acoustic sequence, the acoustic sequence representing an utterance, and the acoustic sequence comprising a respective acoustic feature representation at each of a plurality of time steps;
   generating (i) a phoneme representation of the acoustic sequence comprising a respective phoneme at each of the plurality of time steps and (ii) a grapheme representation of the acoustic sequence comprising a respective grapheme at each of the plurality of time steps, the phoneme representation and grapheme representation being synchronized with respect to time, comprising, for each of the plurality of time steps:
      processing the acoustic feature representation for the time step through each of one or more recurrent neural network layers to generate a recurrent output for the time step,
      processing the recurrent output for the time step using a phoneme output layer to select a phoneme for the time step from a plurality of phonemes, and
      processing the recurrent output for the time step using a grapheme output layer to select a grapheme for the time step from a plurality of graphemes; and
   extracting, from the synchronized phoneme representation and grapheme representation, a respective pronunciation for each of one or more words spoken in the utterance, wherein each pronunciation maps a set of phonemes in the phoneme representation of the acoustic sequence to a set of graphemes in the grapheme representation of the acoustic sequence.

2. The method of claim 1, wherein the phoneme output layer generates a set of scores for the time step, the set of scores for the time step comprising a respective score for each of a plurality of vocabulary phonemes and a blank character phoneme, the score for each vocabulary phoneme representing a likelihood that the vocabulary phoneme represents the utterance at the time step and the score for the blank character phoneme representing a likelihood that the utterance at the time step is incomplete.

3. The method of claim 2, wherein processing the recurrent output for the time step using a phoneme output layer to select a phoneme for the time step from the plurality of phonemes comprises selecting the highest scoring phoneme from the plurality of vocabulary phonemes and the blank character phoneme as the phoneme for the time step.

4. The method of claim 1, wherein the grapheme output layer generates a set of grapheme scores for the time step, the set of grapheme scores for the time step comprising a respective grapheme score for each of a plurality of vocabulary graphemes and a blank character grapheme, the grapheme score for each vocabulary grapheme representing a likelihood that the vocabulary grapheme represents the utterance at the time step and the score for the blank character grapheme representing a likelihood that the utterance at the time step is incomplete.

5. The method of claim 4, wherein the set of grapheme scores for the time step further comprises a respective score for a <space> character grapheme, the grapheme score for the <space> character grapheme representing a likelihood that the utterance at the time step represents a transition from one word to another word.

6. The method of claim 5, wherein extracting, from the phoneme representations and the grapheme representations, a respective pronunciation for each of one or more words spoken in the utterance comprises delimiting the one or more words by splitting the grapheme and phoneme representations for the acoustic feature representations using the <space> character grapheme.

7. The method of claim 5, wherein processing the recurrent output for the time step using a grapheme output layer to select a grapheme for the time step from a plurality of graphemes comprises selecting the highest scoring grapheme from the plurality of vocabulary graphemes and the <space> character grapheme as the grapheme for the time step.

8. The method of claim 1, wherein the recurrent neural network layers are Long Short-Term Memory (LSTM) neural network layers.

9. The method of claim 1, wherein the phoneme output layer and the grapheme output layer are Connectionist Temporal Classification (CTC) output layers.

10. The method of claim 1, wherein the recurrent neural network layers, the grapheme output layer and phoneme output layer have been trained jointly using a set of input training data and a backpropagation technique.

11. The method of claim 10, wherein the backpropagation technique comprises back-propagating gradients for both the grapheme output layer and phoneme output layer to a highest layer of the one or more recurrent neural network layers.

12. The method of claim 5, wherein extracting, from both the phoneme representations and the grapheme representations, a respective pronunciation for each of one or more words spoken in the utterance comprises aligning and splitting the representations using the grapheme <space> character to convert the phoneme representations and grapheme representations to word pronunciations.

13. A system comprising one or more computers and one or more storage devices storing instructions that are operable, when executed by the one or more computers, to cause the one or more computers to perform operations comprising:
receiving an acoustic sequence, the acoustic sequence representing an utterance, and the acoustic sequence comprising a respective acoustic feature representation at each of a plurality of time steps;
generating (i) a phoneme representation of the acoustic sequence comprising a respective phoneme at each of the plurality of time steps and (ii) a grapheme representation of the acoustic sequence comprising a respective grapheme at each of the plurality of time steps, the phoneme representation and grapheme representation being synchronized with respect to time, comprising, for each of the plurality of time steps:
processing the acoustic feature representation for the time step through each of one or more recurrent neural network layers to generate a recurrent output for the time step,
processing the recurrent output for the time step using a phoneme output layer to select a phoneme for the time step from a plurality of phonemes, and
processing the recurrent output for the time step using a grapheme output layer to select a grapheme for the time step from a plurality of graphemes; and
extracting, from the synchronized phoneme representation and grapheme representation, a respective pronunciation for each of one or more words spoken in the utterance, wherein each pronunciation maps a set of phonemes in the phoneme representation of the acoustic sequence to a set of graphemes in the grapheme representation of the acoustic sequence.

14. The system of claim 13, wherein the phoneme output layer generates a set of scores for the time step, the set of scores for the time step comprising a respective score for each of a plurality of vocabulary phonemes and a blank character phoneme, the score for each vocabulary phoneme representing a likelihood that the vocabulary phoneme represents the utterance at the time step and the score for the blank character phoneme representing a likelihood that the utterance at the time step is incomplete.

15. The system of claim 14, wherein processing the recurrent output for the time step using a phoneme output layer to select a phoneme for the time step from a plurality of phonemes comprises selecting the highest scoring phoneme from the plurality of vocabulary phonemes and the blank character phoneme as the phoneme for the time step.

16. The system of claim 13, wherein the grapheme output layer generates a set of grapheme scores for the time step, the set of grapheme scores for the time step comprising a respective grapheme score for each of a plurality of vocabulary graphemes and a blank character grapheme, the grapheme score for each vocabulary grapheme representing a likelihood that the vocabulary grapheme represents the utterance at the time step and the score for the blank character grapheme representing a likelihood that the utterance at the time step is incomplete.

17. The system of claim 16, wherein the set of grapheme scores for the time step further comprises a respective score for a <space> character grapheme, the grapheme score for the <space> character grapheme representing a likelihood that the utterance at the time step represents a transition from one word to another word.

18. The system of claim 17, wherein extracting, from the phoneme representations and the grapheme representations, a respective pronunciation for each of one or more words spoken in the utterance comprises delimiting the one or more words by splitting the grapheme and phoneme representations for the acoustic feature representations using the <space> character grapheme.

19. The system of claim 17, wherein processing the recurrent output for the time step using a grapheme output layer to select a grapheme for the time step from a plurality of graphemes comprises selecting the highest scoring grapheme from the plurality of vocabulary graphemes and the <space> character grapheme as the grapheme for the time step.

20. A non-transitory computer storage medium encoded with instructions that, when executed by one or more computers, cause the one or more computers to perform operations comprising:
receiving an acoustic sequence, the acoustic sequence representing an utterance, and the acoustic sequence comprising a respective acoustic feature representation at each of a plurality of time steps;
generating (i) a phoneme representation of the acoustic sequence comprising a respective phoneme at each of the plurality of time steps and (ii) a grapheme representation of the acoustic sequence comprising a respective grapheme at each of the plurality of time steps, the phoneme representation and grapheme representation being synchronized with respect to time, comprising, for each of the plurality of time steps:
- processing the acoustic feature representation for the time step through each of one or more recurrent neural network layers to generate a recurrent output for the time step,
- processing the recurrent output for the time step using a phoneme output layer to select a phoneme for the time step from a plurality of phonemes, and
- processing the recurrent output for the time step using a grapheme output layer to select a grapheme for the time step from a plurality of graphemes; and extracting, from the synchronized phoneme representation and grapheme representation, a respective pronunciation for each of one or more words spoken in the utterance, wherein each pronunciation maps a set of phonemes in the phoneme representation of the acoustic sequence to a set of graphemes in the grapheme representation of the acoustic sequence.

* * * * *

UNITED STATES PATENT AND TRADEMARK OFFICE
CERTIFICATE OF CORRECTION

PATENT NO. : 10,127,904 B2
APPLICATION NO. : 14/811939
DATED : November 13, 2018
INVENTOR(S) : Kanury Kanishka Rao Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 191 days.

Signed and Sealed this
Twenty-first Day of May, 2019

Andrei Iancu
*Director of the United States Patent and Trademark Office*